(12) United States Patent
Kittaka et al.

(10) Patent No.: US 6,252,722 B1
(45) Date of Patent: *Jun. 26, 2001

(54) ENDOSCOPIC OBJECTIVE LENS

(75) Inventors: Shigeo Kittaka; Nobuo Shibayama, both of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/414,073

(22) Filed: Oct. 7, 1999

(30) Foreign Application Priority Data

Nov. 18, 1998 (JP) .................................. 10-328022

(51) Int. Cl.[7] .............................. G02B 27/64; G02B 3/02
(52) U.S. Cl. .......................................... 359/654; 359/719
(58) Field of Search .................................... 359/618, 652, 359/653, 654, 719

(56) References Cited

U.S. PATENT DOCUMENTS

| | | | | |
|---|---|---|---|---|
| 5,093,719 | * | 3/1992 | Prescott | 345/68 |
| 5,949,585 | * | 9/1999 | Kittaka | 359/645 |
| 5,995,295 | * | 11/1999 | Nagaoka | 359/654 |
| 5,999,327 | * | 12/1999 | Nagaoka | 359/654 |
| 6,078,431 | * | 6/2000 | Kittaka et al. | 359/654 |

OTHER PUBLICATIONS

"Bishokigaku Handobukku (Handbook of Microoptics)", ed. by the Japan Society of Applied Physics and the Society of Optics of Japan. published by Asakura Shoten. 1995, p. 224.

* cited by examiner

*Primary Examiner*—Georgia Epps
*Assistant Examiner*—Saeed Seyrafi
(74) *Attorney, Agent, or Firm*—McGuireWoods LLP

(57) ABSTRACT

Single homogeneous planoconvex lens 10 having a uniform refractive index is combined with single distributed-index lens 12 having its refractive index distributed in a radial direction and the object plane, the homogeneous planoconvex lens, the distributed-index lens and the image plane are arranged in that order along the optical axis. Both surfaces of the distributed-index lens are planar and the homogeneous planoconvex lens has its convex surface directed toward the distributed-index lens and the planar surface toward the object. Various characteristics of the two lenses are so specified as to provide an angle of view greater than 50°.

9 Claims, 17 Drawing Sheets

ENDOSCOPIC OBJECTIVE LENS

BACKGROUND OF THE INVENTION

The present invention relates to an objective lens to be fitted at the distal end of an endoscope, more particularly, to a wide-angle endoscopic objective lens that can provide a view angle (a range in which an image can be focussed by the lens) greater than 50°.

Endoscopes are so constructed that a real image created with an objective lens fitted at the distal end is transmitted through image transmission optics to a position convenient for observation. A suitable image transmission optics is selected depending on use from among various types of fiber bundle and relay optics consisting of an ordinary lens and a gradient index lens.

From the viewpoint of use in connection with the endoscope, the objective lens at the distal end of the endoscope is required to be small in diameter and yet have an ability of forming an in-focused image over a wide view angle. An optics comprising a plurality of spherical lenses is capable of providing a wide visual field while effectively correcting various aberrations. However, the use of a plurality of spherical lenses having an outer diameter smaller than 1 mm results in extremely increased cost associated with difficulty in lens polishing, assembling and adjusting operations.

To overcome this problem, a rod lens having a gradient refractive index in a radial direction is proposed as a low-cost, small-diameter objective lens. The rod lens can be manufactured easily and at low cost by ion-exchange and other techniques to have a diameter not larger than 1 mm. Further, since the rod lens is planar on both sides, the rod lens offers the advantage of great simplicity in polishing both end faces, assembling into an endoscope and achieving alignment of optical axes.

The refractive index of a rod-shaped, gradient index lens is expressed as $$n(r)^2 = n_o^2 \cdot \{1 - (g \cdot r)^2 + h_4(g \cdot r)^4 + h_6(g \cdot r)^6 + h_8(g \cdot r)^8 + \ldots\}$$

where
r: the distance from the optical axis
n(r): the refractive index at distance r from the optical axis
$n_o$: the refractive index on the optical axis
$r_0$: the effective radius of the gradient index lens
g: the gradient index coefficient (2nd order)
$h_4, h_6, h_8, \ldots$ : the gradient index coefficient (higher order).

The peripheral portion of the gradient index lens usually has a great departure from the design value of gradient refractive index, and thus cannot be substantively used as a lens. In some cases, the peripheral portion of the lens is made opaque in order to prevent the stray light due to the reflection from the lateral surfaces of the lens. Hence, the range of the gradient index lens that has a sufficiently good gradient reflective index to contribute to the formation of an in-focused image is defined as the effective radius $r_o$. The effective radius $r_o$ of a rod lens is not necessarily the same as its apparent radius.

If the view angle of a rod-shaped, gradient index lens used as an objective lens is written as θ, the following relation holds $$\theta = n_o \cdot g \cdot r_o \text{ (rad)}$$

Note that the objective lens designated later as Comparative Example (see FIG. 17) has an view angle θ of 38.7°.

If an objective lens having a wide visual field is used with an endoscope, the subject can be seen through a correspondingly wide range, facilitating various operations with the endoscope. In order to increase the view angle θ of the rod-shaped, gradient index lens, the value of $n_o \cdot g \cdot r_o$, hence, the difference in refractive index between the center and the periphery of the lens, must be increased. However, it is generally held that the maximum value of $n_o g \cdot r_o$ for the rod-shaped, gradient index lens that can be easily attained by the ordinary ion-exchange technology in current use is no more than about 0.70. In other words, a wide-angle rod-shaped, gradient index lens having a view angle θ in excess of 0.7 rad (i.e. about 40°) is considerably difficult or troublesome to manufacture.

SUMMARY OF THE INVENTION

An object, therefore, of the present invention is to solve the aforementioned problem of the prior art by providing a wide-angle endoscopic objective lens that can be manufactured easily at low cost.

The endoscopic objective lens of the invention comprises the combination of a single homogeneous planoconvex lens having a homogeneous refractive index and a single gradient index lens having a gradient refractive index in a radial direction thereof, wherein (1) an object plane, the planoconvex lens, the gradient index lens and an image plane are arranged in that order along an optical axis;

(2) both surfaces of the gradient index lens are planar and its gradient refractive index is expressed as $$n(r)^2 = n_o^2 \{1 - (g \cdot r)^2 + h_4(g \cdot r)^4 + h_6(g \cdot r)^6 + h_8(g \cdot r)^8 + \ldots\}$$

where
$1.45 \leq n_o \leq 1.90$
$0.45 \leq n_o \cdot g \cdot r_o \leq 0.90$
provided that
r: a distance from the optical axis
n(r) a refractive index at distance r from the optical axis
$n_o$: a refractive index on the optical axis
$r_o$: an effective radius of the gradient index lens
g: a gradient index coefficient (2nd order)
$h_4, h_6, h_8, \ldots$ : a gradient index coefficient (higher order)

(3) the planoconvex lens has its convex surface positioned closer to the gradient index lens and its planar surface closer to an object, with its refractive index n and radius of curvature R of the convex surface satisfying $$1.45 \leq n \leq 4.00$$

$$0.8 r_o \leq R \leq 3.0 r_o$$

and the image plane being positioned either at or near an end face of the gradient index lens.

As used in the specification, the "effective radius $r_o$ of the gradient index lens" means the radius of that portion of the lens which effectively works as a focusing lens. This may be defined as the "range in which the RMS wave front aberration on the optical axis is no more than 0.07λ". The effective radius $r_o$ of the gradient index lens affects its refractive power and hence serves as a numerical reference in design. In fact, there are many cases that the peripheral portion of a manufactured gradient index lens is widely offset from the design value of gradient refractive index and fails to provide the intended lens action. Take, for example, a gradient index lens has a nominal outside diameter of 1 mm, but the portion of the lens, which provides the intended lens action, is 0.8 mm in diameter. In this case, the effective radius $r_o$ is 0.4 mm. According to the present invention, a rod-shaped, gradient index lens is combined with a planoconvex lens having a homogeneous refractive index to provide a view angle greater than 50°. FIG. 1 shows the optical path of the endoscopic objective lens of the invention. The planoconvex lens indicated by 10 is provided in front of the rod-shaped, gradient index lens 12 to reduce the angle of oblique incident light before said light is launched into the rod-shaped, gradient index lens 12. An aperture diaphragm 14 is provided ahead of the planoconvex lens 10 to eliminate the peripheral light apart from the optical axis. The gradient index lens 12 forms a real image at an end face 12a and the real image thus formed is transmitted through a fiber bundle 16 or other image transmitting optics to a point convenient for observation. FIG. 2 shows the optical path of a comparative case solely comprised of the gradient index lens 12. The objective lens of the invention uses the gradient index lens 12 having the same value of $n_o \cdot g \cdot r_o$ as the comparative case, and yet it provides a far wider view angle.

The gradient index lens used in the invention is so designed that the its on-axis refractive index $n_o$ is between 1.45 (inclusive) and 1.90 (inclusive) and this defines the range over which the lens can be practically manufactured by ion-exchange and other techniques. The value of $n_o \cdot g \cdot r_o$ which corresponds to refractive power is adjusted to lie between 0.45 (inclusive) and 0.90 (inclusive). Below the lower limit 0.45, the obtained view angle is too narrow. As already mentioned, the upper limit that can be readily attained by the current ion-exchange technology is about 0.7 and given future improvements in glass composition, it is extremely difficult to manufacture gradient index lenses with $n_o \cdot g \cdot r_o$ values greater than 0.90. In addition, even if the gradient index lens has the $n_o \cdot g \cdot r_o$ value 0.90, the view angle θ that can be attained solely by the gradient index lens is 0.9 rad (about 52°).

The effective radius $r_o$ of the gradient index lens is desirably in the range from 0.05 mm (inclusive) to 0.5 mm (inclusive). For reducing the overall size of the optics and in order to minimize lens aberrations, $r_o$ is desirably no more than 0.5 mm. A lens having $r_o$ less than 0.05 mm is extremely difficult to manufacture.

In the present invention, the spherical aberration and curvature of field of the overall optics are corrected by gradient index coefficient $h_4$, $h_6$, $h_8$, . . . . For the sake of simplicity, let the terms of $h_6$ and higher orders be zero and approximate the gradient refractive index of the gradient index lens by $$n(r)^2 = n_o^2 \cdot \{1 - (g \cdot r)^2 + h_4(g \cdot r)^4\}$$

The value of $h_4$ is desirably in the range from −4 (inclusive) to +3 (inclusive). A gradient index lens with $h_4$ of less than −4 or greater than +3 is extremely difficult to manufacture.

Another feature of the present invention is that the refractive index n of the planoconvex lens is between 1.45 (inclusive) and 4.00 (inclusive). This condition is necessary to ensure that not only optical glass and plastics but also special grades of glass, crystals of high refractive index and semiconductors can be used as lens materials. Many semiconductors are opaque to visible light but in the infrared region very high refractive indices can be used as indicated below.

AlP n=3.03
AlAs n3.18
AlSb n=3.79
GaP n=3.45
GaAs n=3.62
GaSb n=3.82
InP n=3.40

("Bishokogaku Handobukku (Handbook of Microoptics)", ed. by the Japan Society of Applied Physics and the Society of Optics of Japan, published by Asakura Shoten, 1995, p. 224).

The radius of curvature R of the convex spherical surface of the planoconvex lens is referenced to the effective radius $r_o$ of the gradient index lens and adjusted to lie between $0.8r_o$ (inclusive) and 3.0 (inclusive). If R is less than $0.8r_o$, it is difficult to correct aberrations. If R is greater than $3.0r_o$, no wide visual field can be assured.

If the planoconvex lens is made of optical glass or a plastic, its refractive index n is approximately between 1.45 (inclusive) and 2.2 (inclusive). Hence, the preferred range of R, or the radius of curvature of the convex spherical surface of the planoconvex lens is from $0.8r_o$ (inclusive) to $1.95 r_o$ (inclusive)

The radius of the planoconvex lens is preferably adjusted to be nearly equal to that of the gradient index lens with which it is combined. By grinding and polishing a part of mass-producible lenses such as ball lenses, small-diameter planoconvex lenses can be manufactured at low cost even if they are generally hemispherical; hence, the use of such small-diameter planoconvex lenses can suppress the increase in the overall production cost.

From the foregoing discussion, it can be concluded that the endoscopic objective lens of the invention preferably satisfies the following conditions:

$$0.05 \text{ mm} \leq r_o \leq 0.5 \text{ mm} \quad (1)$$

$$1.45 \leq n \leq 2.20 \quad (2)$$

$$0.8r_o \leq R \leq 1.95 r_o \quad (3)$$

$$\text{view angle} \geq 50°. \quad (4)$$

To attain the above-noted object, the present invention also provides an objective lens system installed in a distal end of. an endoscope to form an in-focused image of an object onto an image plane. The system comprises:

a planoconvex lens having a homogeneous refractive index, the planoconvex lens;

a rod-shaped, gradient index lens having a gradient refractive index in a radial direction thereof; and a cover tube supporting the planoconvex lens and the gradient index lens so that the planoconvex lens and the gradient index lens are aligned coaxially and an end surface of the gradient index lens is located closer to a convex surface of the planoconvex lens than to a planar surface of the planoconvex lens, wherein a view angle in which the in-focused image can be formed using a combination of the planoconvex lens and the gradient index lens is greater than 50° with respect to an optical axis.

It is preferable that the objective lens system further comprises: an aperture diaphragm located opposite from the gradient index lens with respect to the planoconvex lens, and the aperture diaphragm is attached to the planar surface of the planoconvex lens.

It is also preferable that the end surface of the gradient index lens is in contact with the convex surface of the planoconvex lens.

It is also preferable that the gradient refractive index of the gradient index lens in the objective lens system is expressed as $$n(r)^2 = n_o^2 \cdot \{1-(g \cdot r)^2 + h_4(g \cdot r)^4 + h_6(g \cdot r)^6 + h_8(g \cdot r)^8 + \ldots\}$$

where $1.45 \leq n_o \leq 1.90$ $0.45 \leq n_o \cdot g \cdot r_o \leq 0.90$ provided that r: a distance from the optical axis n(r) a refractive index at distance r from the optical axis $n_o$: a refractive index on the optical axis $r_o$: an effective radius of the gradient index lens g: a 2nd order gradient index coefficient $h_4, h_6, h_8, \ldots$: a higher order gradient index coefficient.

It is also preferable that the planoconvex lens in the objective lens system satisfies the following conditions:

$1.45 \leq n \leq 4.00$ $0.8 r_o \leq R \leq 3.0 r_o$ where n: the homogeneous refractive index of the planoconvex lens R: a radius of curvature R of the convex surface of the planoconvex lens.

It is also preferable that the planoconvex lens and the gradient index lens in the objective lens system further satisfy the followings: satisfies the following conditions:

$0.05 \text{ mm} \leq r_o \leq 0.5 \text{ mm}$ (1)

$1.45 \leq n \leq 2.20$ (2)

$0.8 r_o \leq R \leq 1.95 r_o$. (3)

The present disclosure relates to the subject matter contained in Japanese patent application No. Hei. 10-328022 (filed on Nov. 18, 1998), which is expressly incorporated herein by reference in its entirety.

DESCRIPTION OF THE PREFERRED EMBODIMENT

To manufacture an endoscopic objective lens of the invention, a planoconvex lens having a homogeneous refractive index and a gradient index lens having a gradient refractive index are made integral, with their optical axes being brought into alignment.

An example of the structure of the assembly is shown in FIG. 3.

Figure 1:
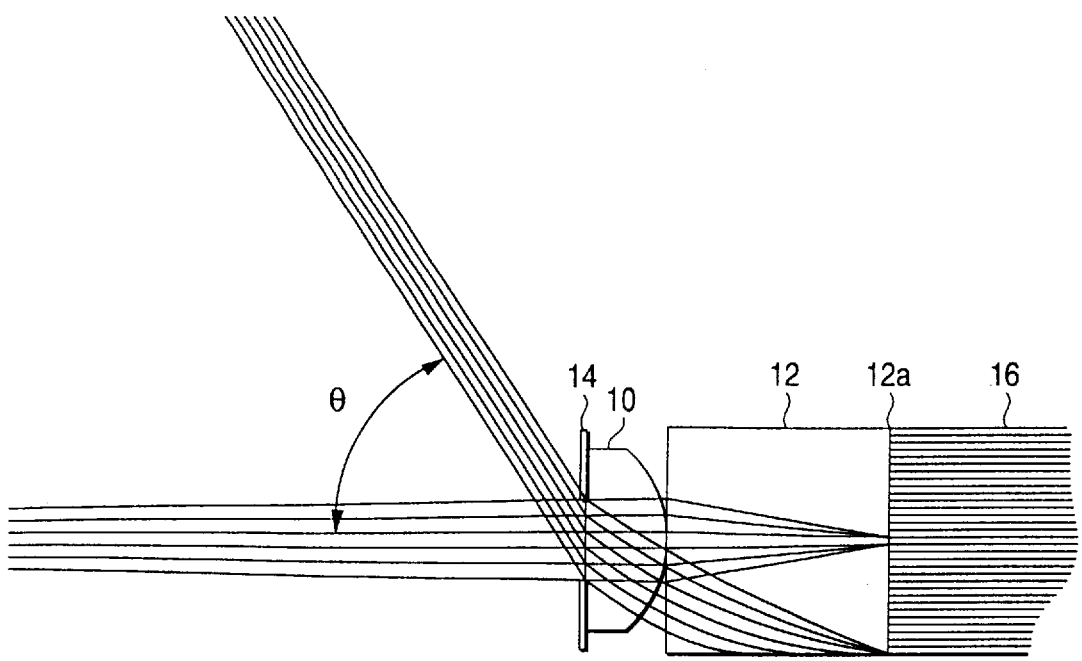
FIG. 1 illustrates the optical path in the endoscopic objective lens of the invention.
Figure 2:
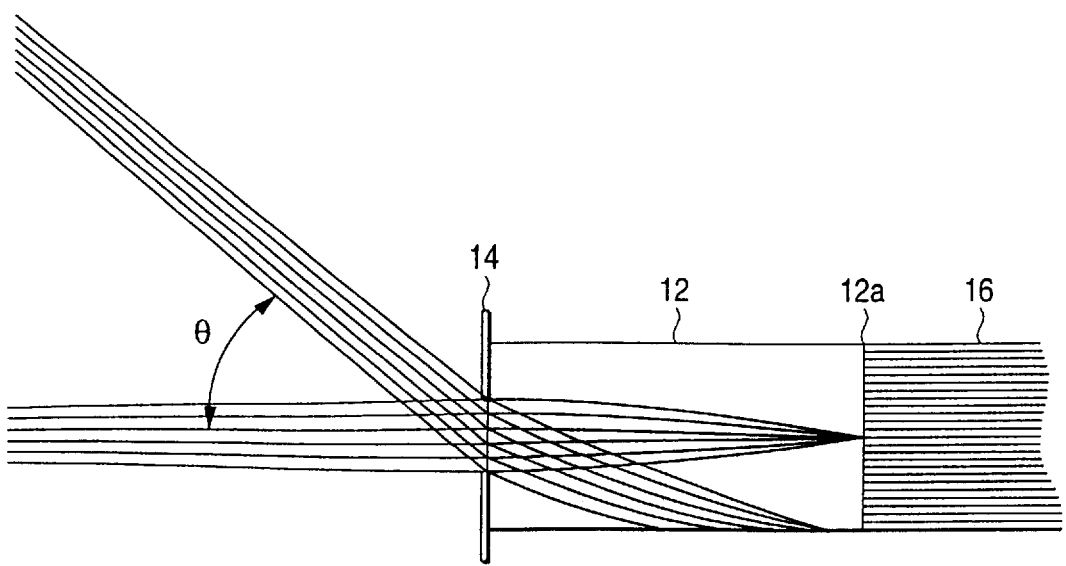
FIG. 2 illustrates the optical path in a comparative example.
Figure 3A:
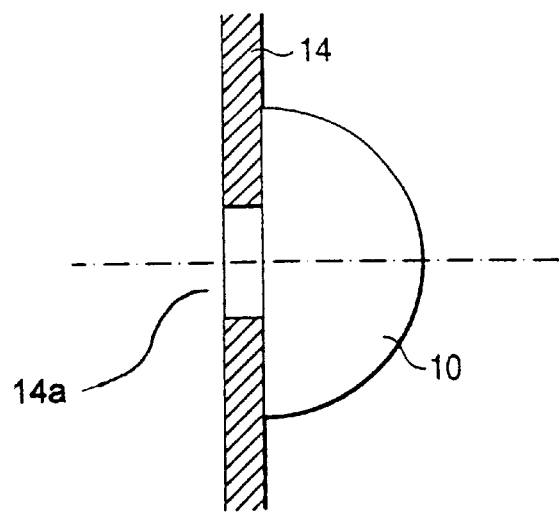
FIG. 3 illustrates how an example of the endoscopic objective lens of the invention is assembled.
Figure 3B:
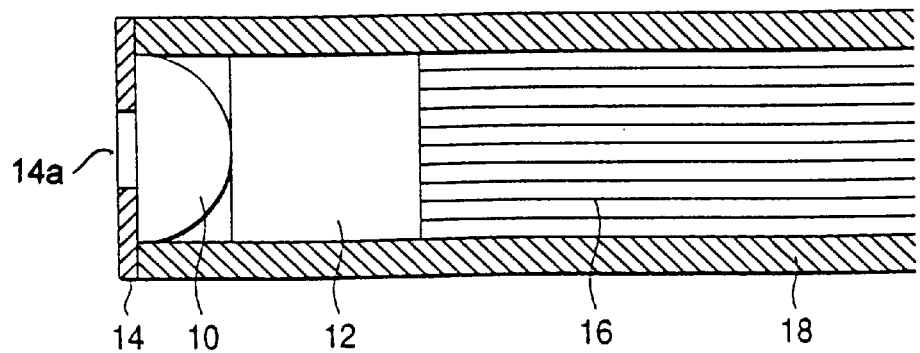
Figure 4:
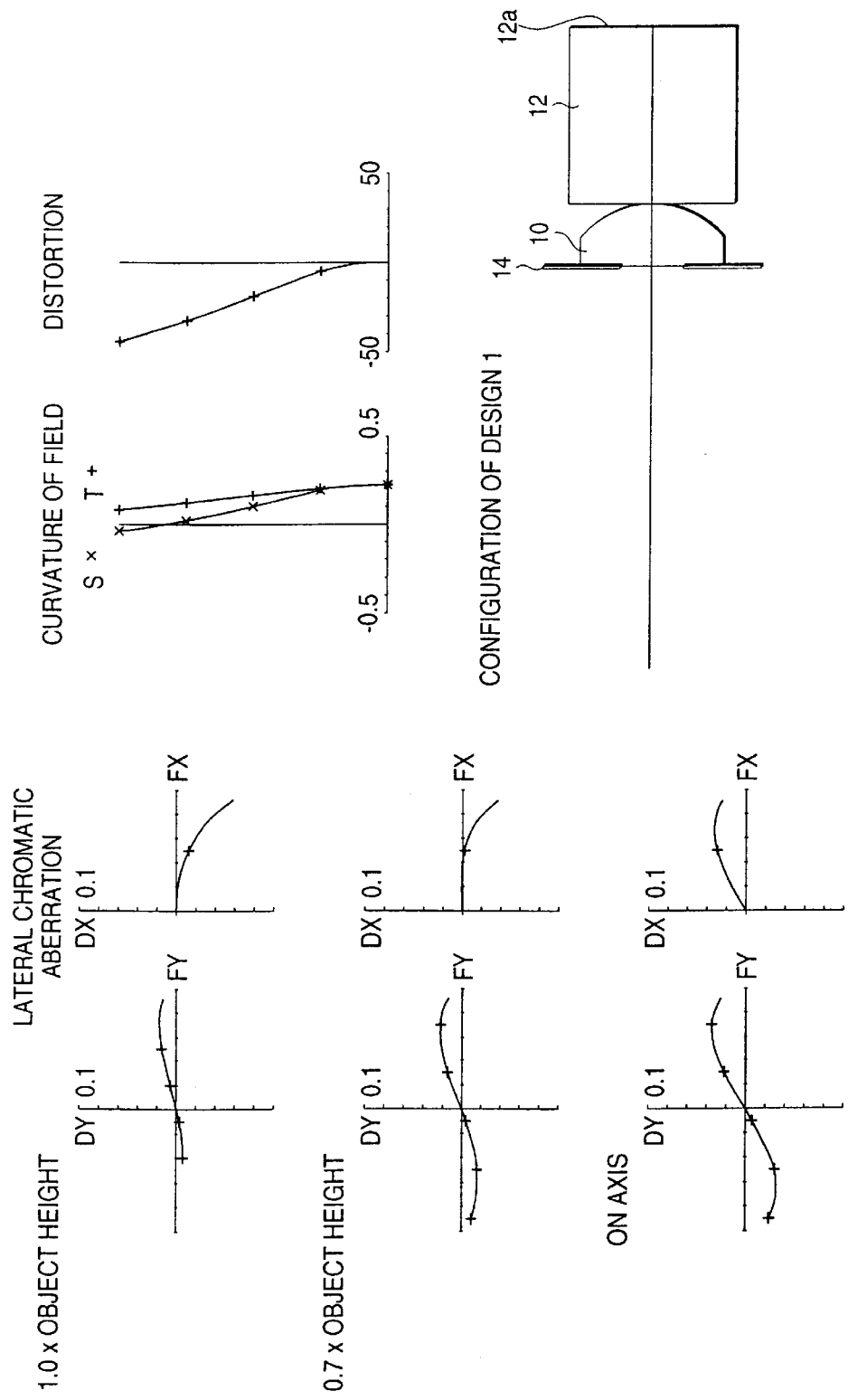
FIG. 4 illustrates the configuration of design No. 1, as well as the lateral chromatic aberration, curvature of field and distortion that develop in that design.
Figure 5:
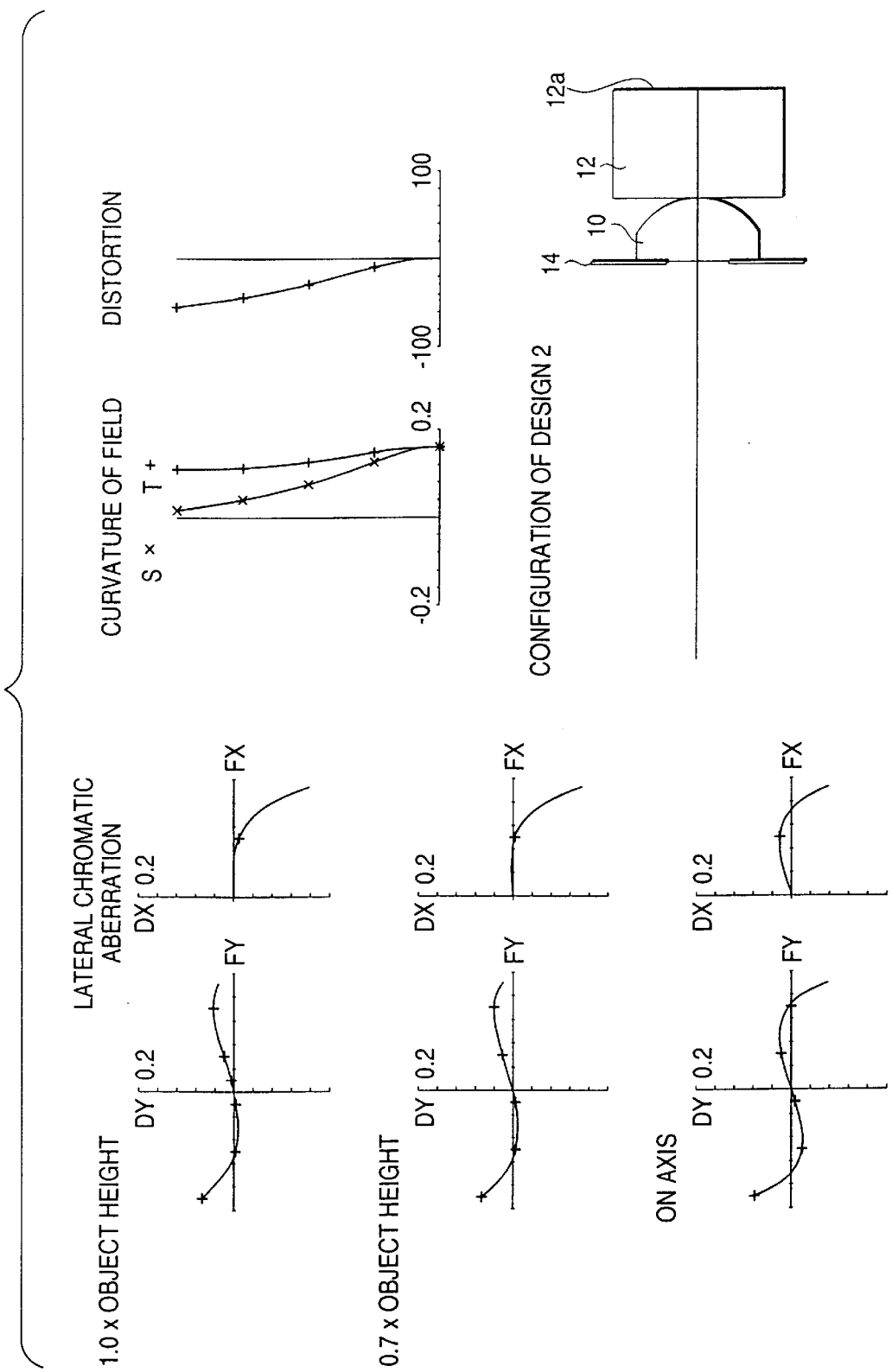
FIG. 5 illustrates the configuration of design No. 2, as well as the lateral chromatic aberration, curvature of field and distortion that develop in that design.
Figure 6:
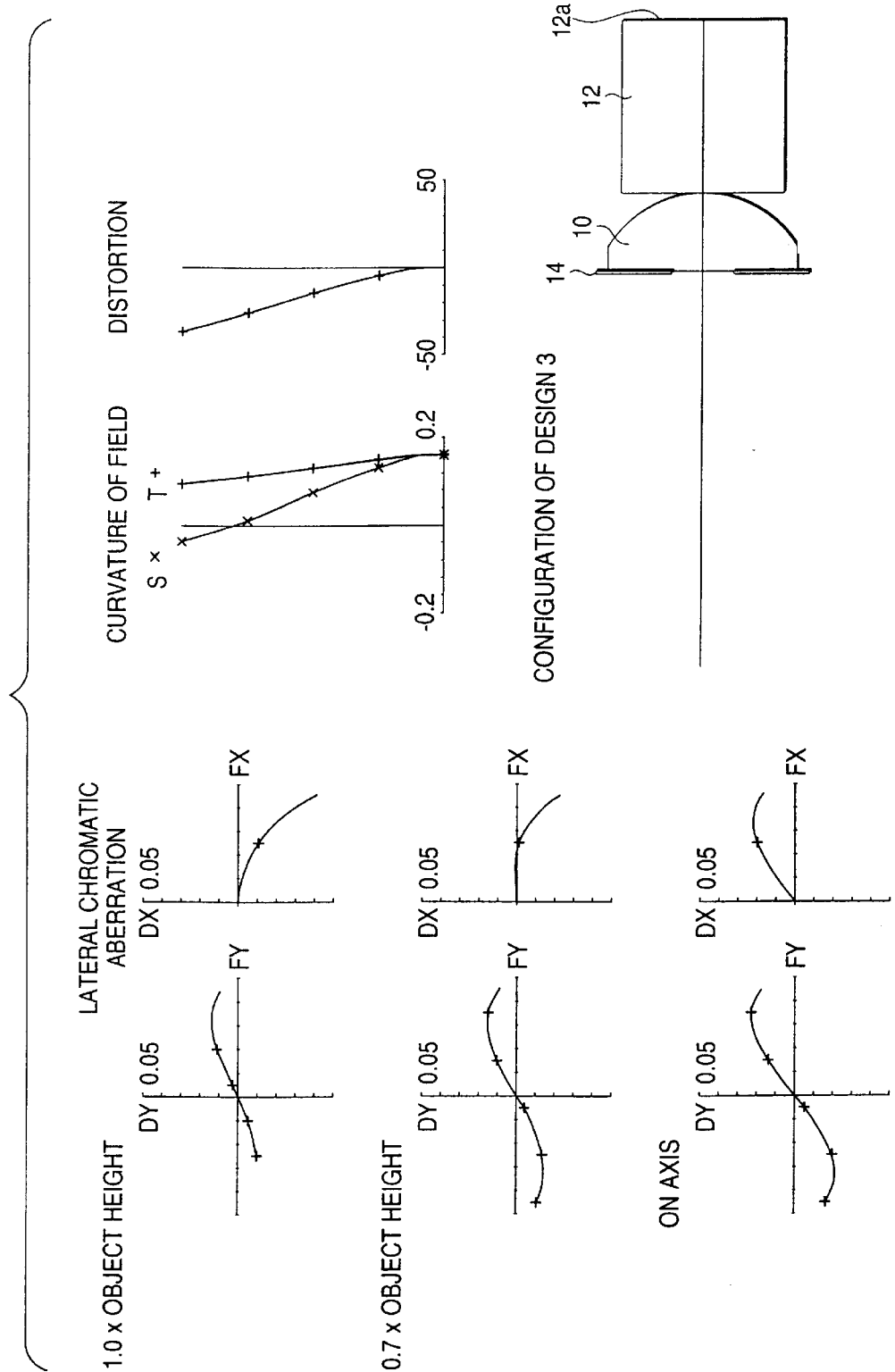
FIG. 6 illustrates the configuration of design No. 3, as well as the lateral chromatic aberration, curvature of field and distortion that develop in that design.
Figure 7:
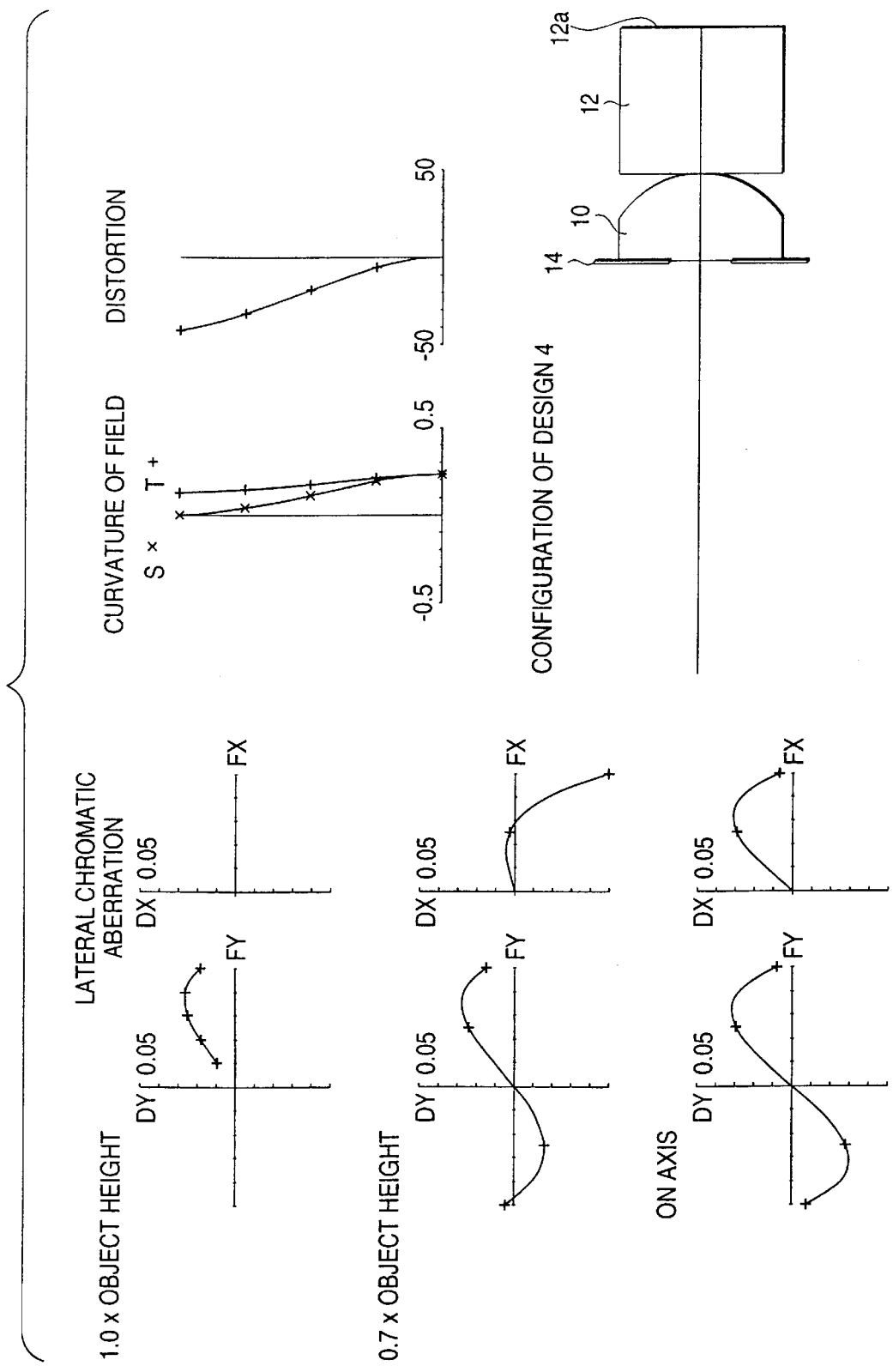
FIG. 7 illustrates the configuration of design No. 4, as well as the lateral chromatic aberration, curvature of field and distortion that develop in that design.
Figure 8:
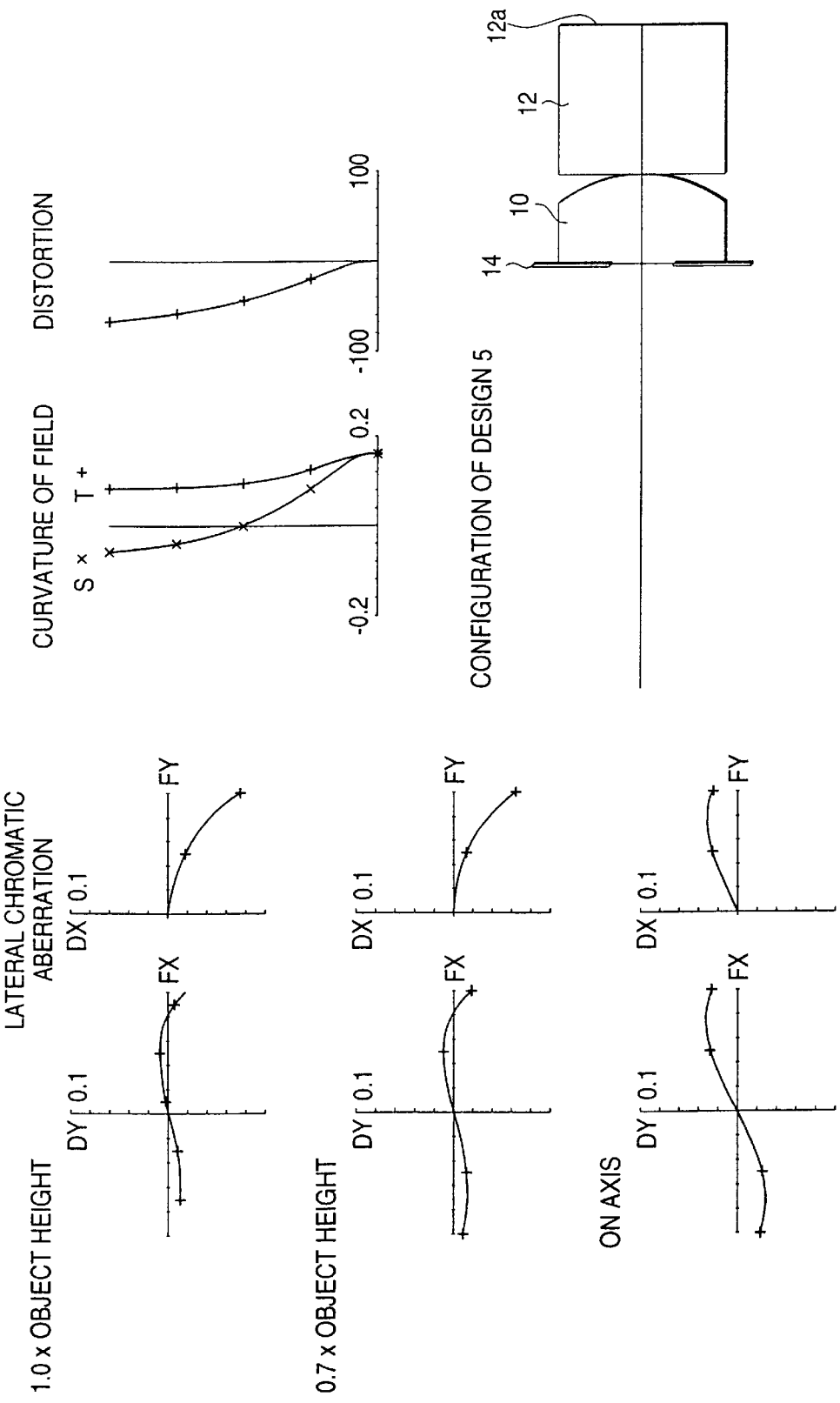
FIG. 8 illustrates the configuration of design No. 5, as well as the lateral chromatic aberration, curvature of field and distortion that develop in that design.
Figure 9:
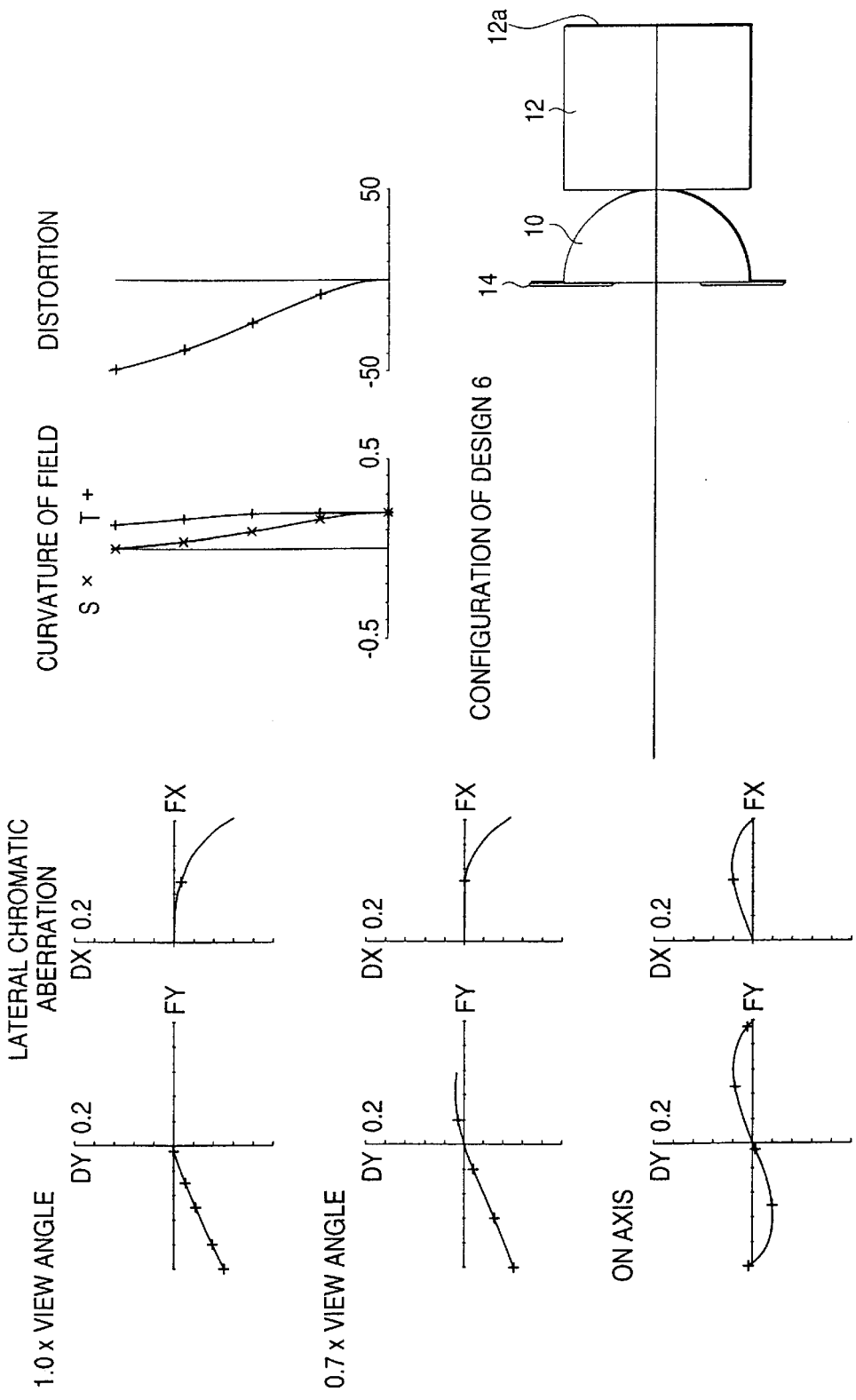
FIG. 9 illustrates the configuration of design No. 6, as well as the lateral chromatic aberration, curvature of field and distortion that develop in that design.
Figure 10:
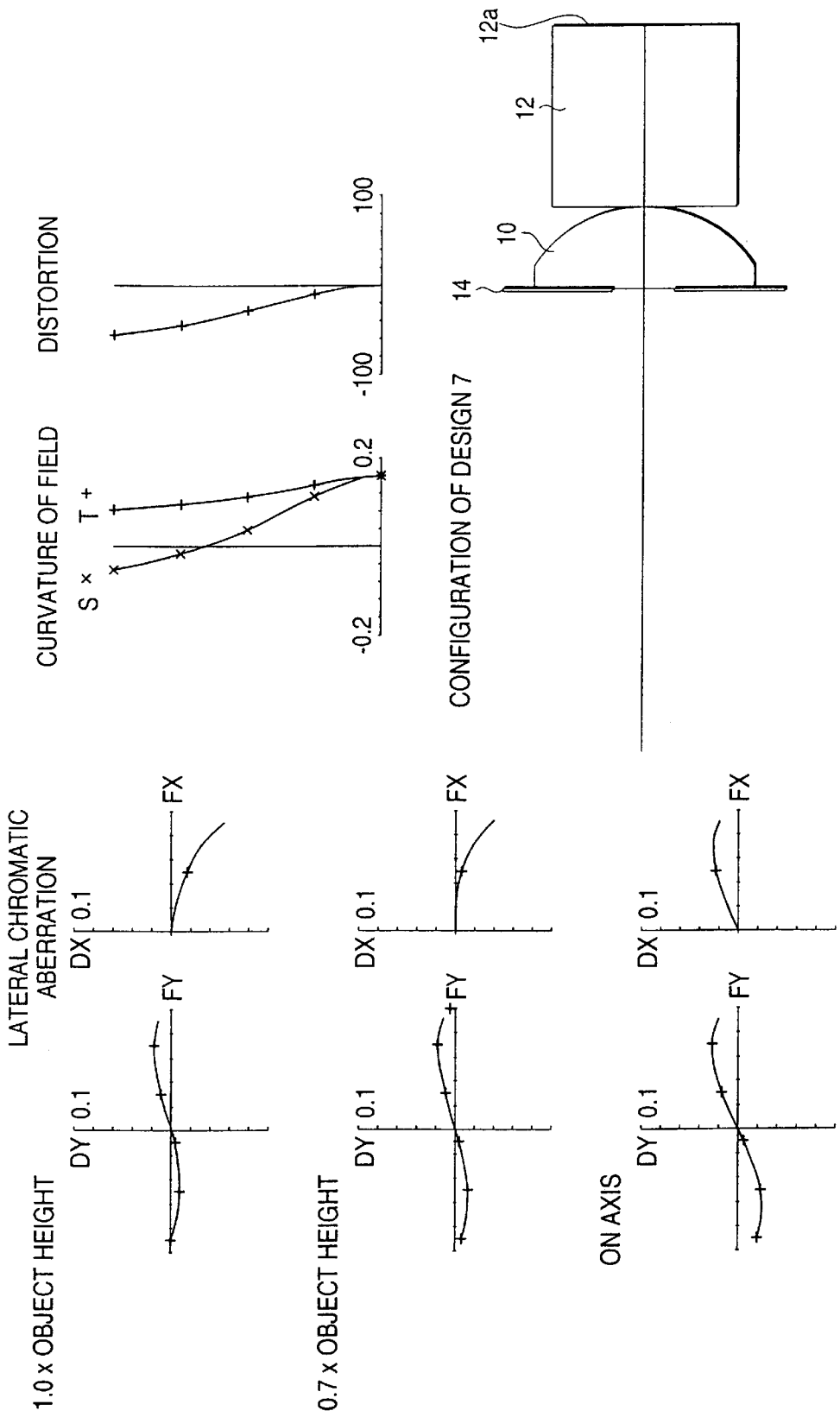
FIG. 10 illustrates the configuration of design No. 7, as well as the lateral chromatic aberration, curvature of field and distortion that develop in that design.
Figure 11:
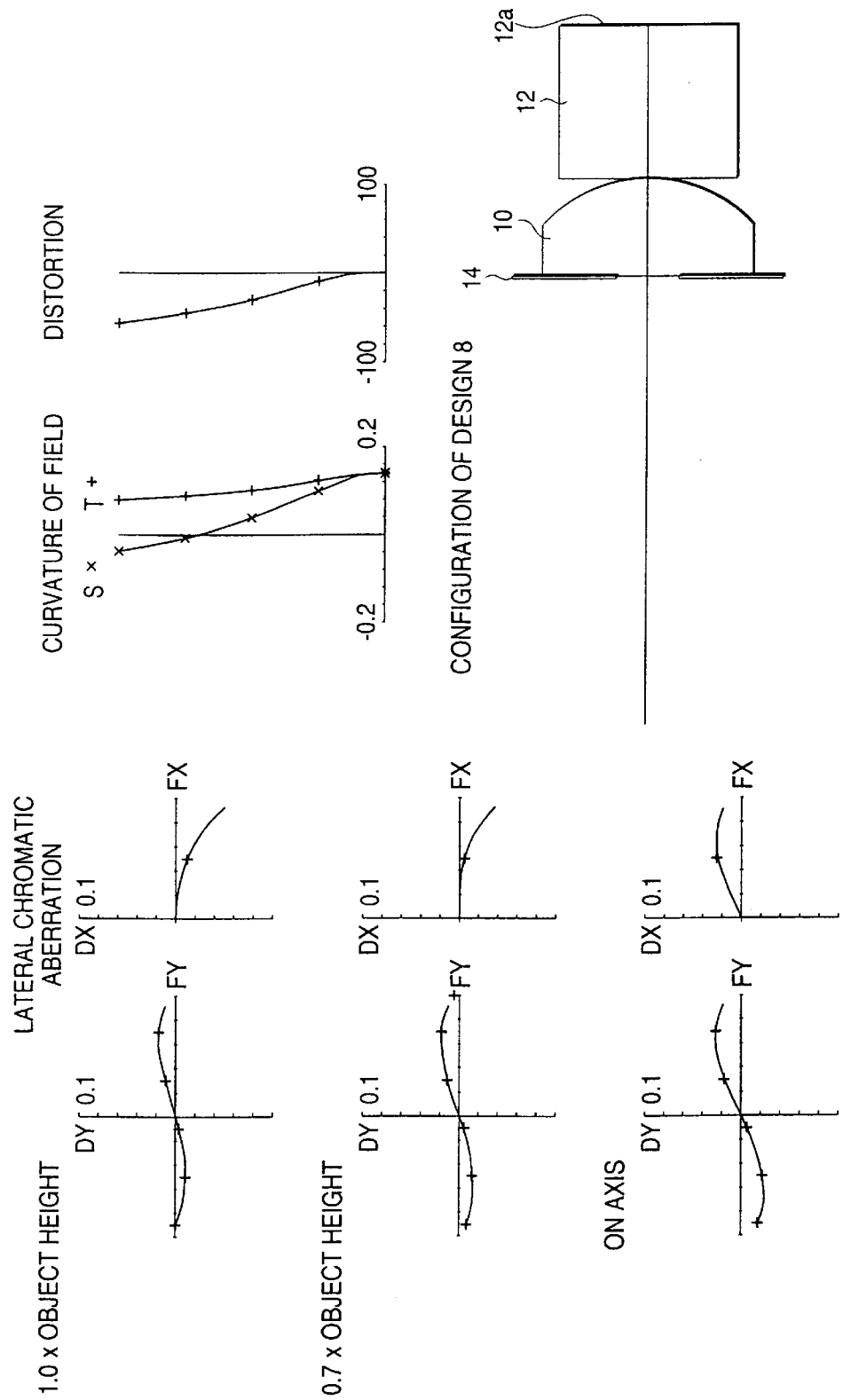
FIG. 11 illustrates the configuration of design no. 8, as well as the lateral chromatic aberration, curvature of field and distortion that develop in that design.
Figure 12:
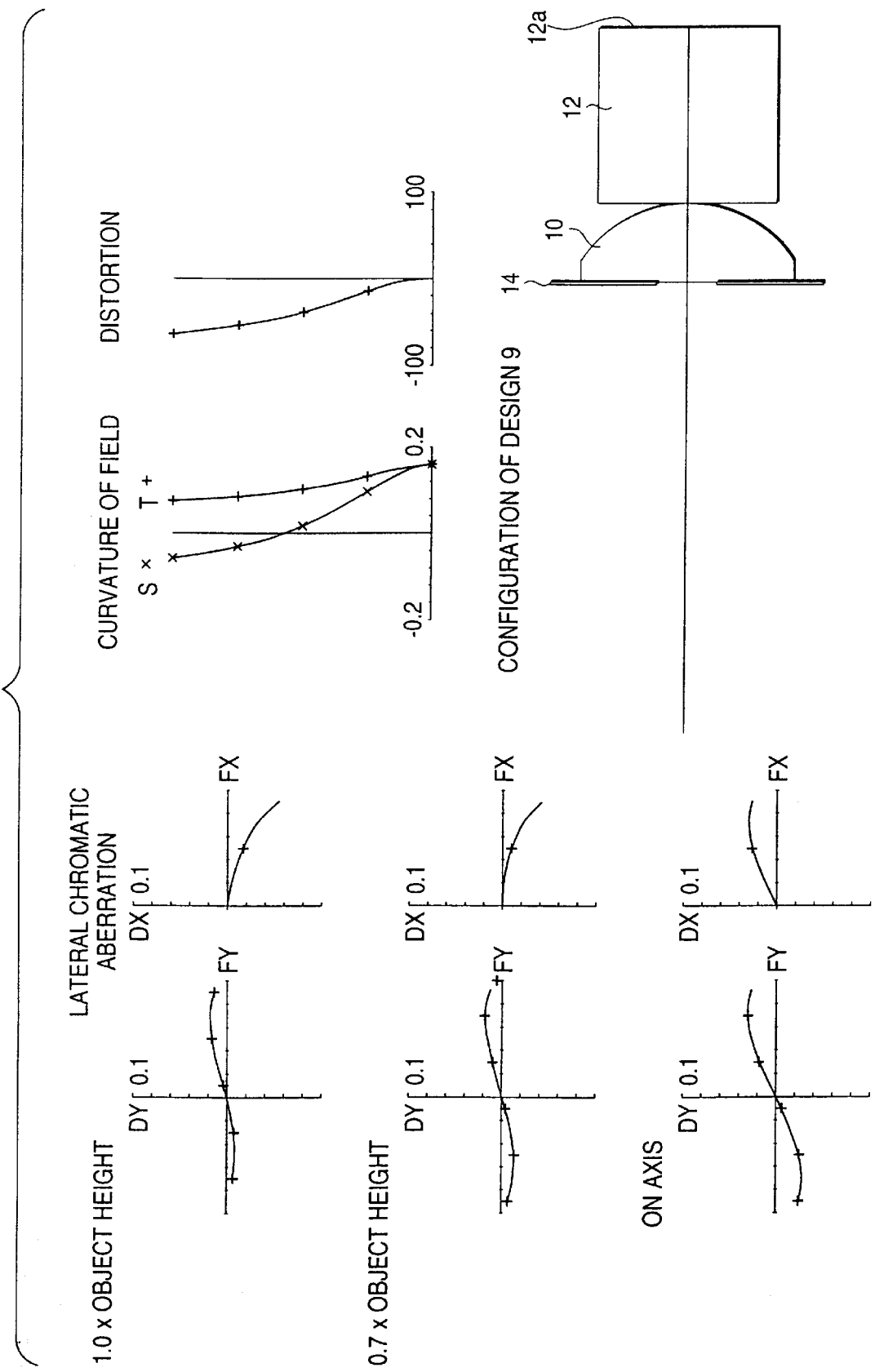
FIG. 12 illustrates the configuration of design No. 9, as well as the lateral chromatic aberration, curvature of field and distortion that develop in that design.
Figure 13:
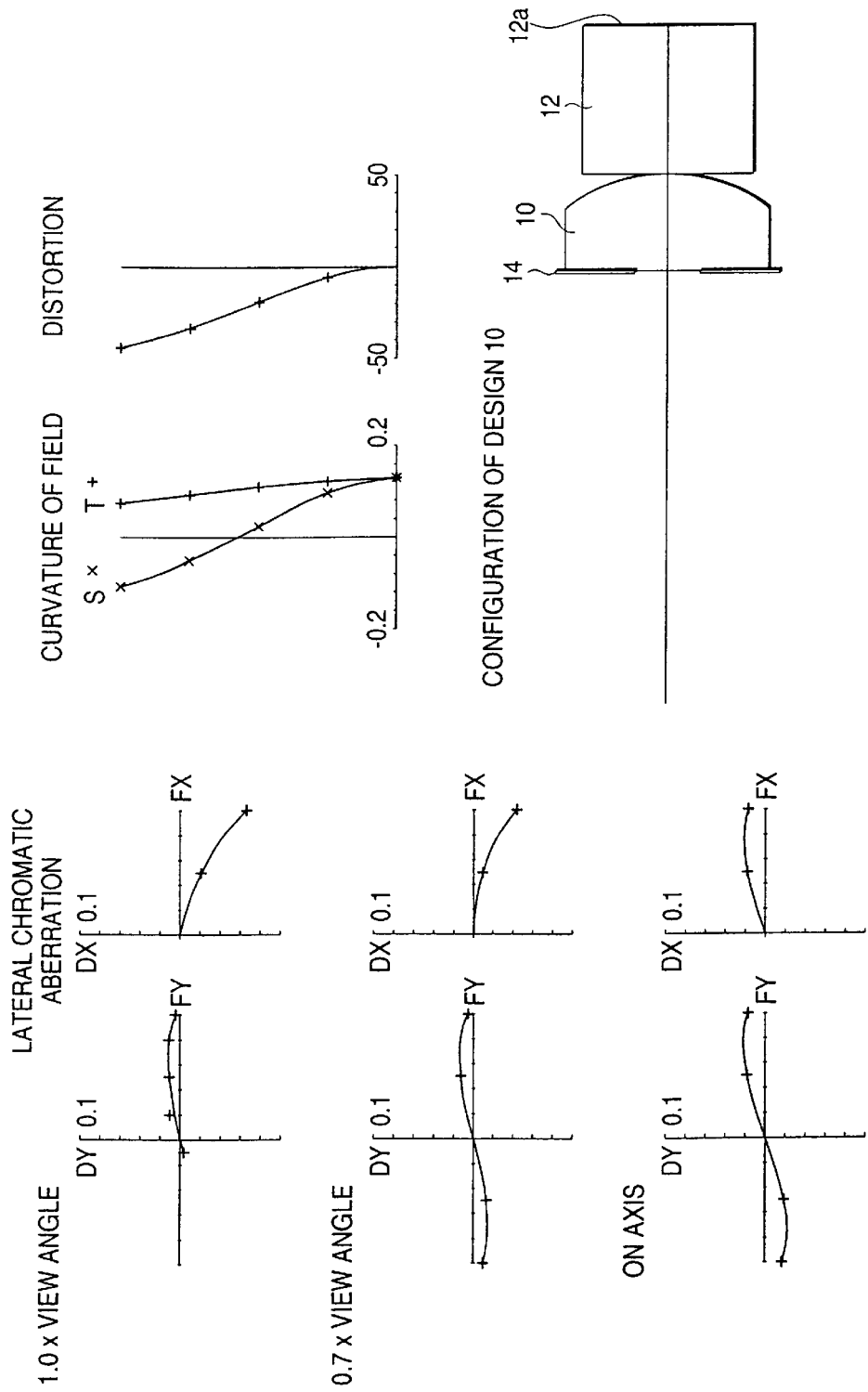
FIG. 13 illustrates the configuration of design No. 10, as well as the lateral chromatic aberration, curvature of field and distortion that develop in that design.
Figure 14:
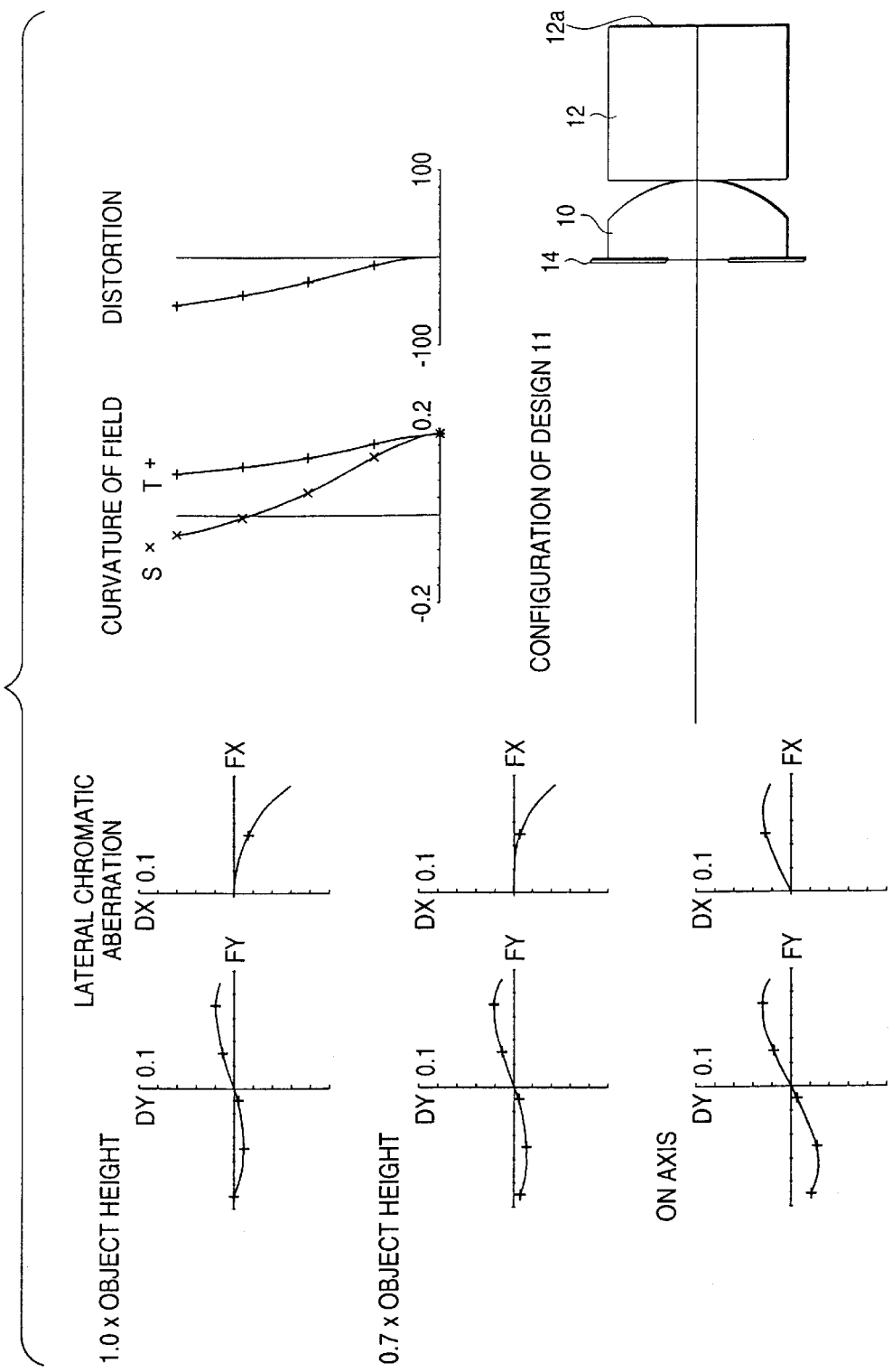
FIG. 14 illustrates the configuration of design No. 11, as well as the lateral chromatic aberration, curvature of field and distortion that develop in that design.
Figure 15:
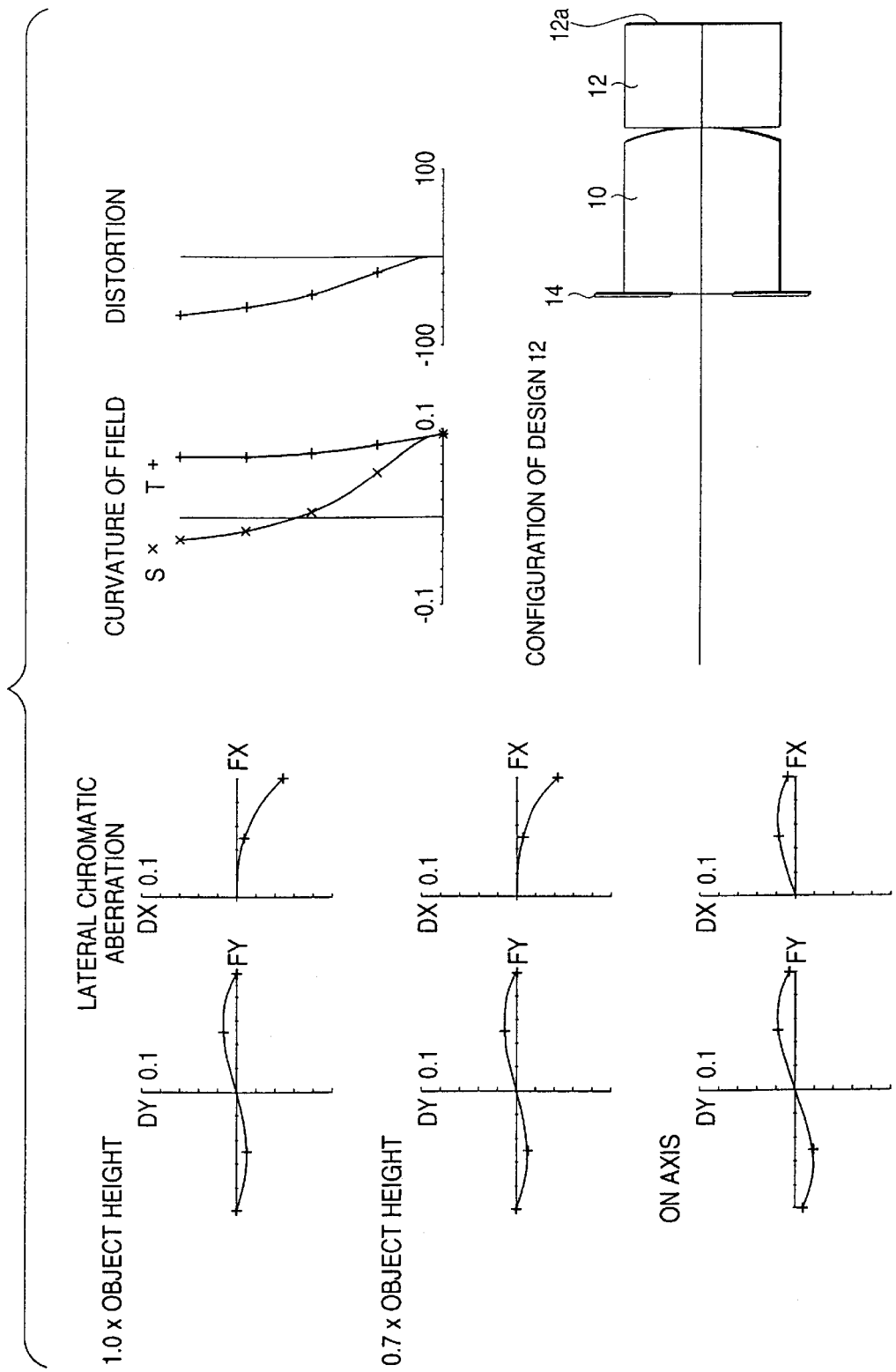
FIG. 15 illustrates the configuration of design No. 12, as well as the lateral chromatic aberration, curvature of field and distortion that develop in that design.
Figure 16:
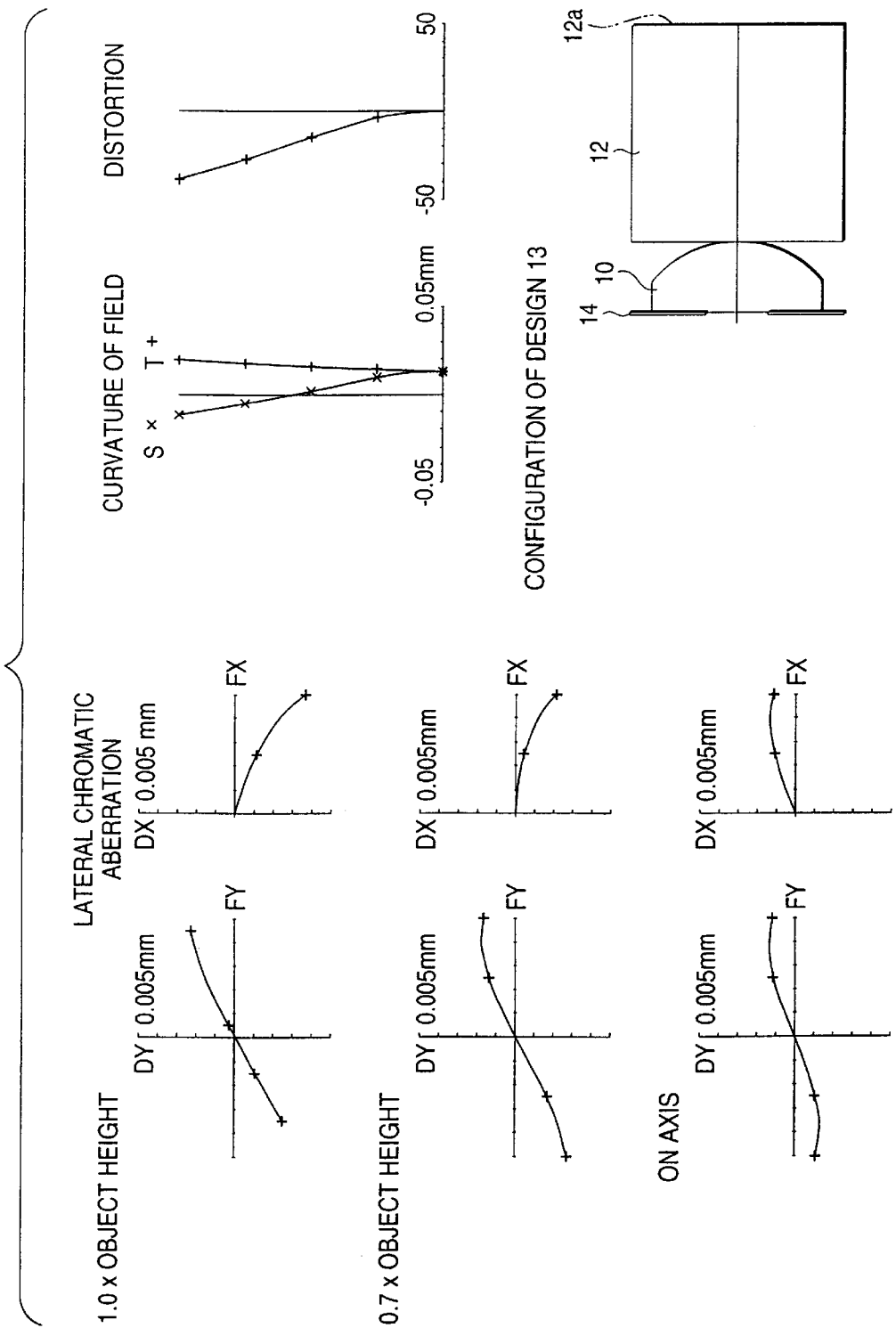
FIG. 16 illustrates the configuration of design No. 13, as well as the lateral chromatic aberration, curvature of field and distortion that develop in that design.

The following is a recommended procedure for assembling the two lenses. As shown in FIG. 3A, an aperture diaphragm 14 having a central opening 14a in a plate member is fitted or attached to the planar side of the planoconvex lens 10. Then, as shown in FIG. 3B, the gradient index lens 12 and a fiber bundle 16 in mutual abutment are contained in a cover tube 18, and the planoconvex lens 10 with the aperture diaphragm 14 attached in the manner shown in FIG. 3A is mounted in the distal end portion of the cover tube 18 such that its convex surface contacts an end face of the gradient index lens 12. This provides an easy way to assemble the respective parts into a complete form. To join them, the preferred method is by applying a uv curable resin and allowing it to cure upon exposure to uv radiation.

The objective lens of the invention is desirably used with light including visible light at wavelengths of about 0.3 to 2 $\mu$m. UV light at wavelengths shorter than 0.3 m are substantially absorbed by the lens material. Considering the use of a CCD or an image pickup tube, the suitable wavelength of light is no longer than 2 $\mu$m.

The endoscopic objective lens of the invention is solely made up of lenses having positive refractive index and hence involves difficulty in correcting chromatic aberrations. However, in small-diameter ($\leq 1$ mm) lenses, the absolute values of chromatic aberrations are tolerably small. To further reduce the chromatic aberrations, it is desirable to make the planoconvex lens of small-dispersion materials such as lanthanum-containing optical. glass. Needless to say, chromatic aberrations are not a problem at all if monochromatic light is used.

Depending on the specific application of an endoscope and the way it is used, not only various types of fiber bundle but also relay optics comprising an ordinary lens and a gradient index lens may be used as the image transmission optics.

EXAMPLES

Specific designs of the endoscopic objective lens of the invention are shown below in Tables 1 to 3 together with a comparative example (using only the gradient index lens). All design values, except those for design No. 13, are normalized against the effective radius $r_o$ of the gradient index lens which is taken as 1. In design No. 13, length is expressed in millimeters to calculate MTF values. In each design and the comparative example, an end face of the gradient index lens is taken as the image plane assuming that a fiber bundle as the image transmission optics is brought into contact with said end face. The position of the image plane does not coincide with the paraxial focal pint since the former is so determined as to ensure that a satisfactory image is produced throughout the entire range of view angles.

| Design No. | 1 | 2 | 3 | 4 | 5 |
|---|---|---|---|---|---|
| Object height | 30 | 40 | 25 | 30 | 60 |
| Distance between object and planoconvex lens | 20 | 20 | 20 | 20 | 20 |
| View Angle θ | 56.3° | 63.4° | 51.3° | 56.3° | 71.6° |
| Radius of aperture diaphragm | 0.4 | 0.4 | 0.4 | 0.5 | 0.5 |
| Refractive index of planoconvex lens n | 1.520 | 1.900 | 1.750 | 1.803 | 2.200 |
| Radius of curvature of planoconvex lens R | −1.000 | −0.800 | −1.400 | −1.200 | −1.800 |
| Thickness of planoconvex lens | 0.700 | 0.721 | 0.978 | 0.990 | 1.000 |
| Distance between two lenses | 0 | 0 | 0 | 0 | 0 |
| Radius of gradient index lens $r_o$ | 1.00 | 1.00 | 1.00 | 1.00 | 1.00 |
| On-axis refractive index $n_o$ | 1.640 | 1.800 | 1.700 | 1.550 | 1.682 |
| Gradient index coefficient g | 0.400 | 0.388 | 0.350 | 0.300 | 0.440 |
| $n_o \cdot g \cdot r_o$ | 0.656 | 0.698 | 0.595 | 0.465 | 0.740 |
| Gradient index coefficient $h_4$ | −0.982 | −4.000 | −0.629 | −2.529 | −0.377 |
| Thickness of gradient index lens | 2.007 | 1.200 | 2.258 | 1.782 | 1.717 |
| Focal length | 1.200 | 0.758 | 1.250 | 1.230 | 1.007 |

| Design No. | 6 | 7 | 8 | 9 | 10 |
|---|---|---|---|---|---|
| Object height | — | 40 | 40 | 50 | — |
| Distance between object and planoconvex lens | Infinity | 20 | 20 | 20 | Infinity |
| View angle θ | 62.0° | 63.4° | 63.4° | 68.2° | 56.0° |
| Radius of aperture diaphragm | 0.5 | 0.4 | 0.4 | 0.4 | 0.4 |
| Refractive index of planoconvex lens n | 1.486 | 1.911 | 2.200 | 1.9091 | 1.9042 |
| Radius of curvature of planoconvex lens R | −1.000 | −1.400 | −1.600 | −1.449 | −1.927 |
| Thickness of planoconvex lens | 1.000 | 0.929 | 1.087 | 0.887 | 1.146 |
| Distance between two lenses | 0 | 0 | 0 | 0 | 0 |
| Radius of gradient index lens $r_o$ | 1.00 | 1.00 | 1.00 | 1.00 | 1.00 |
| On-axis refractive index $n_o$ | 1.80 | 1.800 | 1.800 | 1.900 | 1.450 |
| Gradient index coefficient g | 0.500 | 0.388 | 0.388 | 0.400 | 0.500 |
| $n_o \cdot g \cdot r_o$ | 0.900 | 0.698 | 0.698 | 0.760 | 0.725 |
| Gradient index coefficient $h_4$ | +0.058 | −0.799 | −0.799 | −0.693 | 0.048 |
| Thickness of gradient index lens | 1.802 | 1.936 | 1.770 | 2.006 | 1.814 |
| Focal length | 0.993 | 1.050 | 0.978 | 1.018 | 1.163 |

| Design No. | 11 | 12 | 13 | Comparative Example |
|---|---|---|---|---|
| Object height | 40 | 60 | 6.50 mm | 16 |
| Distance between object and planoconvex lens | 20 | 20 | 5.00 mm | 20 |
| View Angle θ | 63.4° | 71.6° | 52.4° | 38.7° |
| Radius of aperture diaphragm | 0.4 | 0.4 | 0.0303 mm | 0.4 |
| Refractive index of planoconvex lens n | 1.8651 | 3.82 | 1.520 | — |
| Radius of curvature of planoconvex lens R | −1.300 | −3.00 | −0.125 mm | — |
| Thickness of planoconvex lens | 0.909 | 2.286 | 0.087 mm | — |
| Distance between two lenses | 0 | 0 | 0 | — |
| Radius of gradient index lens $r_o$ | 1.00 | 1.00 | 0.125 mm | 1.00 |

-continued

|  | | | | |
|---|---|---|---|---|
| On-axis refractive index $n_o$ | 1.650 | 1.640 | 1.640 | 1.640 |
| Gradient index coefficient g | 0.400 | 0.400 | 3.20 mm$^{-1}$ | 0.400 |
| $n_o \cdot g \cdot r_o$ | 0.660 | 0.656 | 0.656 | 0.656 |
| Gradient index coefficient $h_4$ | −0.905 | +0.600 | 0.00 | +0.463 |
| Thickness of gradient index lens | 1.750 | 1.431 | 0.268 mm | 4.000 |
| Focal length | 1.070 | 0.873 | 0.1495 mm | 1.525 |

In each design according to the present invention, the view angle is greater than 500. It should be particularly noted that except in design No. 3, the view angle is even wider than 55°.

Figure 17:
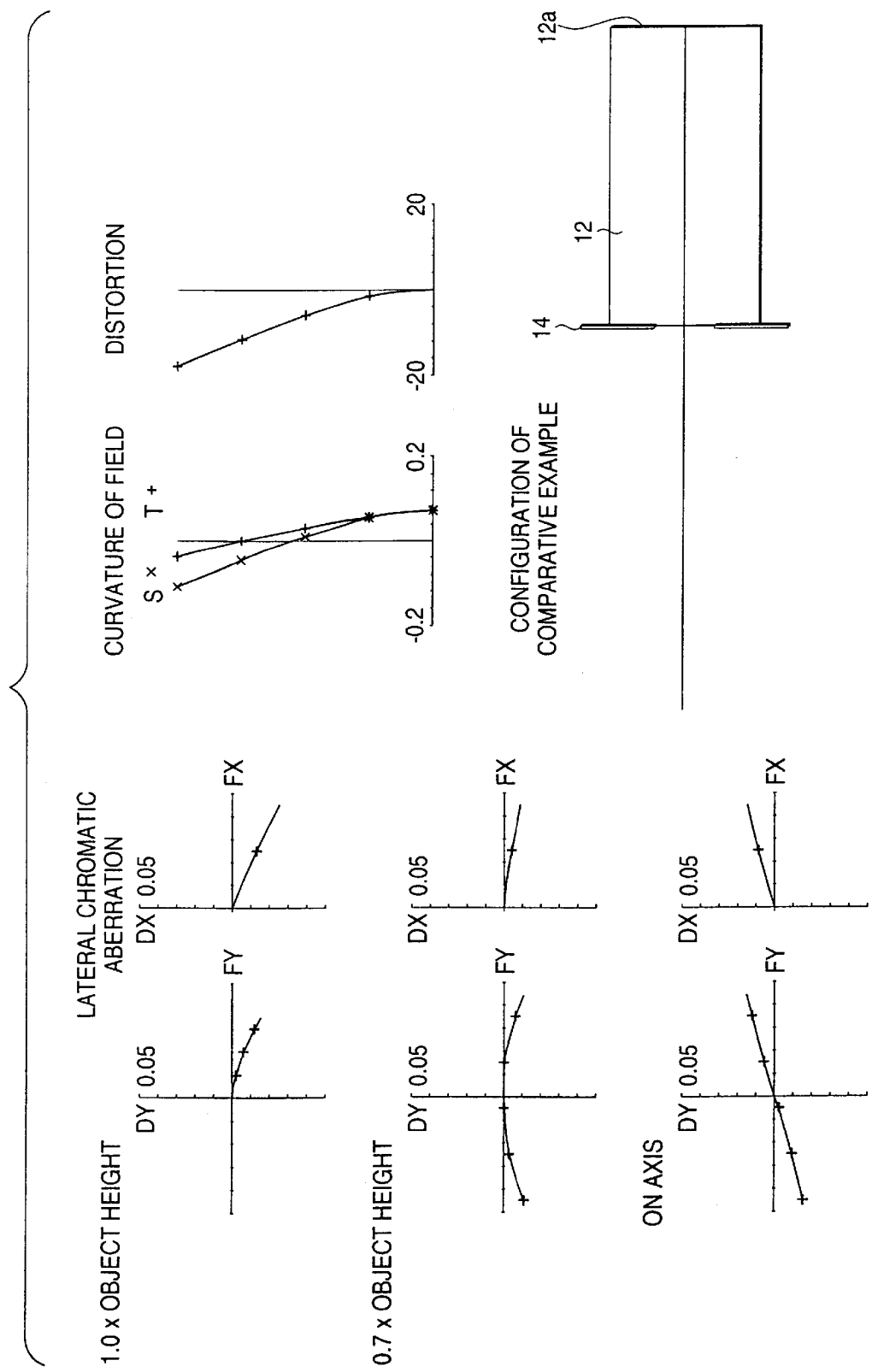
FIG. 17 illustrates the configuration of the comparative example, as well as the lateral chromatic aberration, curvature of field and distortion that develop in that example.

The configurations of the respective design No., as well as the lateral chromatic aberration, curvature of field and distortion that develop in them are shown in FIGS. 4 to 16. The configuration of the comparative example, as well as the lateral chromatic aberration, curvature of field and distortion that develop in it are shown in FIG. 17. In each of these figures, the lateral chromatic aberration is indicated for three cases, on the optical axis, at 0.7 times the object height, and at 1.0 time the object height. Note that in design Nos. 6 and 10 which relate to an infinity lens, the lateral chromatic aberration is indicated for the following three cases, on the optical axis, at 0.7 times the view angle, and at 1.0 time the view angle. DY and DX represent the aberrations in tangential and sagittal directions, respectively, with $r_o$ taken as unity (1). FY and FX represent the positions in which the rays of light pass through the aperture diaphragm, the terminal end of each defining the radius of the aperture. The curvature of field is expressed in both a sagittal direction S and a tangential direction T; length is expressed with $r_o$ taken as unity and the terminal end of each vertical axis defines the image height. The horizontal axis of the graph plotting the distortion is graduated by percentage and the terminal end of the vertical axis plots the image height. In each of the diagrams showing lens configuration, numeral 10 indicates the planoconvex lens having the homogeneous refractive index, 12 the gradient index lens, 12a its end face (coinciding with the image plane) and 14 the aperture diaphragm.

Figure 18:
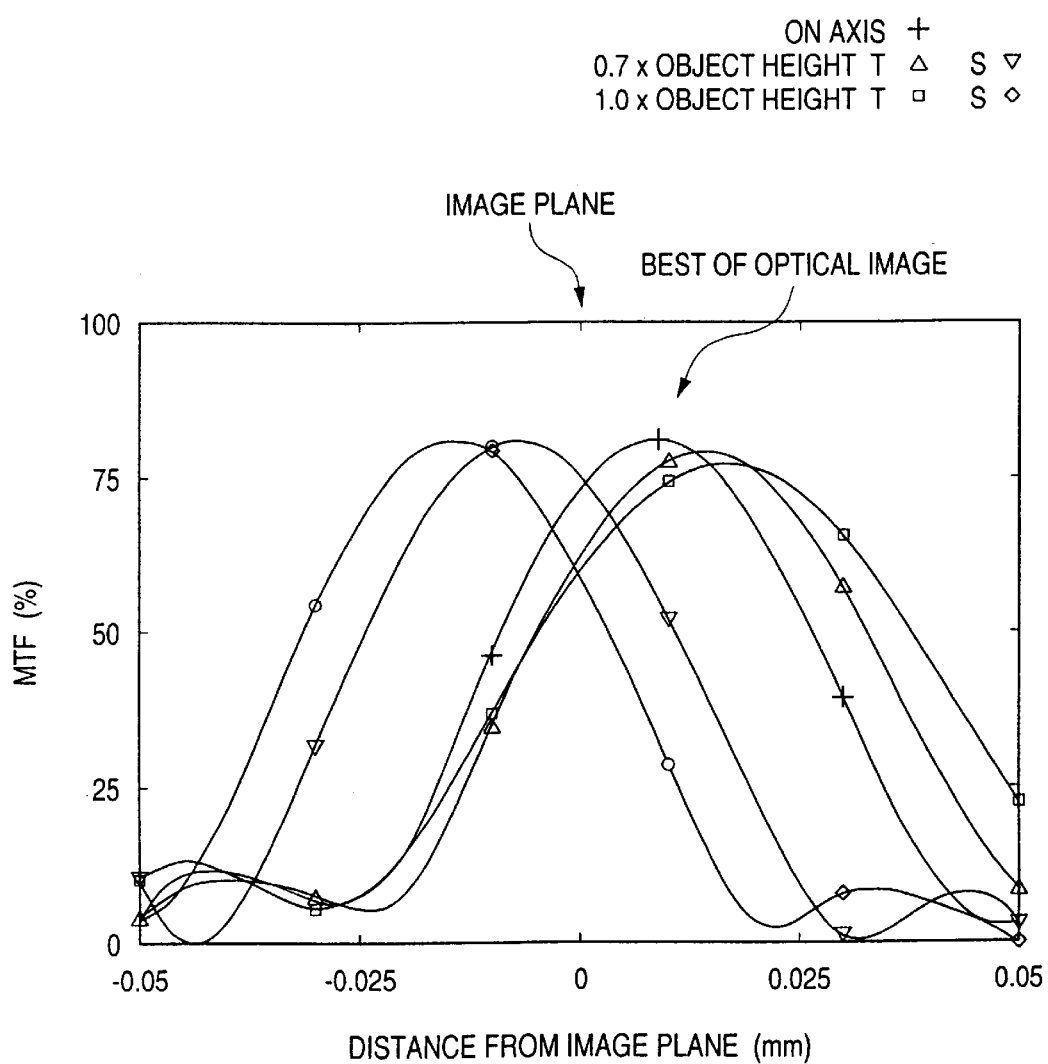
FIG. 18 is a graph plotting the MTF versus the distance from the image plane.

In design No. 13, considering the size of the actually used objective lens, the radius of the gradient index lens was taken as 0.125 mm and MTF values were calculated. FIG. 18 shows MTF values (100 line pairs per millimeter) for design No. 13 near the image plane. T represents a tangential image and S a sagittal image. In design No. 13, greater emphasis is placed on the peripheral image than in other positions of the image plane and MTF values of at least about 60% are assured at the aforementioned three points, on-axis, 0.7 times the object height and 1.0 time the object height. If the position of the image plane is modified to the best position on the optical axis (0.01 mm from the image plane), a maximum of about 80% is obtained for the on-axis MTF value.

What is claimed is:

1. An objective lens system installed in a distal end of an endoscope to form an in-focused image of an object onto an image plane, said system comprising:
    a planoconvex lens having a homogeneous refractive index;
    a rod-shaped, gradient index lens having a gradient refractive index in a radial direction thereof; and
    a cover tube supporting the planoconvex lens and the gradient index lens so that the planoconvex lens and the gradient index lens-are aligned coaxially and an end surface of the gradient index lens is located closer to a convex surface of the planoconvex lens than to a planar surface of the planoconvex lens,
    wherein a view angle in which the in-focused image can be formed using a combination of the planoconvex lens and the gradient index lens is greater than 50° with respect to an optical axis.

2. The objective lens system according to claim 1, further comprising: an aperture diaphragm located opposite from the gradient index lens with respect to the planoconvex lens.

3. The objective lens system according to claim 2, wherein the aperture diaphragm is attached to the planar surface of the planoconvex lens.

4. The objective lens system according to claim 1, wherein the end surface of the gradient index lens is in contact with the convex surface of the planoconvex lens.

5. The objective lens system according to claim 1, wherein the gradient refractive index of the gradient index lens is expressed as $$n(r)^2 = n_o^2 \cdot \{1-(g \cdot r)^2 + h_4(g \cdot r)^4 + h_6(g \cdot r)^6 + h_8(g \cdot r)^8 + \ldots\}$$

where
$1.45 \leq n_o \leq 1.90$
$0.45 \leq n_o \cdot g \cdot r_o \leq 0.90$
provided that
r: a distance from the optical axis
n(r) a refractive index at distance r from the optical axis
$n_o$: a refractive index on the optical axis
$r_o$: an effective radius of the gradient index lens
g: a 2nd order gradient index coefficient
$h_4, h_6, h_8, \ldots$: a higher order gradient index coefficient.

6. The objective lens system according to claim 5, wherein the planoconvex lens satisfies the following conditions:

$$1.45 \leq n \leq 4.00$$
$$0.8 r_o \leq R \leq 3.0 r_o$$

where
n: the homogeneous refractive index of the planoconvex lens
R: a radius of curvature R of the convex surface of the planoconvex lens.

7. The objective lens system according to claim 6, wherein the planoconvex lens and the gradient index lens further satisfy the followings: satisfies the following conditions:

$$0.05 \text{ mm} \leq r_o \leq 0.5 \text{ mm} \quad (1)$$
$$1.45 \leq n \leq 2.20 \quad (2)$$
$$0.8 r_o \leq R \leq 1.95 r_o \quad (3).$$

8. An endoscopic objective lens comprising a combination of a single homogeneous planoconvex lens having a homogeneous refractive index and a single gradient index lens having a gradient refractive index in a radial direction thereof, wherein
    (1) an object plane, the planoconvex lens, the gradient index lens and an image plane are arranged in that order along an optical axis;
    (2) both surfaces of the gradient index lens are planar and its gradient refractive index is expressed as $$n(r)^2 = n_o^2 \cdot \{1-(g \cdot r)^2 + h_4(g \cdot r)^4 + h_6(g \cdot r)^6 h_8(g \cdot r)^8 + \ldots\}$$

where $1.45 \leq n_o \leq 1.90$ $0.45 \leq n_o \cdot g \cdot r_o \leq 0.90$ provided that r: a distance from the optical axis
n(r): a refractive index at distance r from the optical axis
$n_o$: a refractive index on the optical axis
$r_o$: an effective radius of the gradient index lens
g: a 2nd order gradient index coefficient
$h_4, h_6, h_8, \ldots$ : a higher order gradient index coefficient (3) the planoconvex lens has its convex surface positioned toward the gradient index lens and its planar surface positioned toward an object, with its refractive index n and radius of curvature R of the convex surface satisfying $1.45 \leq n \leq 4.00$ $0.8 r_o \leq R \leq 3.0 r_o$ and the image plane being positioned either at or near one of the planar surfaces of the gradient index lens.

9. The endoscopic objective lens according to claim 8, which satisfies the following conditions:

$$0.05 \text{ mm} \leq r_o \leq 0.5 \text{ mm} \quad (1)$$

$$1.45 \leq n \leq 2.20 \quad (2)$$

$$0.8 r_o \leq R \leq 1.95 r_o \quad (3)$$

view angle $\geq 50°$.

* * * * *